(«12») United States Patent
Persson et al.

(10) Patent No.: US 10,858,830 B2
(45) Date of Patent: Dec. 8, 2020

(54) DEVICE AND METHOD FOR SUSPENSION OF A SUSPENDED CEILING AND A SUSPENDED CEILING

(71) Applicant: SAINT-GOBAIN ECOPHON AB, Hyllinge (SE)

(72) Inventors: Torbjörn Persson, Helsingborg (SE); Jan Wilkens, Höganäs (SE); Thomas Nilsson, Helsingborg (SE)

(73) Assignee: SAINT-GOBAIN ECOPHON AB, Hyllinge (SE)

( * ) Notice: Subject to any disclaimer, the term of this patent is extended or adjusted under 35 U.S.C. 154(b) by 0 days.

(21) Appl. No.: 16/315,259

(22) PCT Filed: Jul. 5, 2017

(86) PCT No.: PCT/EP2017/066779
§ 371 (c)(1),
(2) Date: Jan. 4, 2019

(87) PCT Pub. No.: WO2018/007447
PCT Pub. Date: Jan. 11, 2018

(65) Prior Publication Data
US 2019/0161965 A1    May 30, 2019

(30) Foreign Application Priority Data
Jul. 5, 2016  (EP) ..................... 16177965

(51) Int. Cl.
*E04B 9/18* (2006.01)
*F16B 45/00* (2006.01)
*F16B 47/00* (2006.01)

(52) U.S. Cl.
CPC ................ *E04B 9/18* (2013.01); *F16B 45/00* (2013.01); *F16B 47/003* (2013.01)

(58) Field of Classification Search
CPC .......... E04B 9/18; F16B 45/00; F16B 47/003; F16B 11/00
(Continued)

(56) References Cited

U.S. PATENT DOCUMENTS 2,366,459 A    1/1945  Rosa
2,385,296 A    9/1945  Moore
(Continued)

FOREIGN PATENT DOCUMENTS

WO    WO-2014207145 A1 *  12/2014  ............... E04B 9/18
WO    WO-2015015224 A1 *   2/2015  ............... F16B 35/06

OTHER PUBLICATIONS

International Search Report from International Application No. PCT/EP2017/066779 dated Dec. 1, 2017.

*Primary Examiner* — Beth A Stephan
(74) *Attorney, Agent, or Firm* — Brundidge & Stanger, P.C.

(57) ABSTRACT

A device for suspension of a suspended ceiling, comprising an elongated suspension member (3) having a first end (10) and an opposing second end (11), an anchoring head (4) being arranged at the first end (10); a housing (2) having an open top side (5) and an opposed, closed bottom side (6), the (2) housing defining a housing cavity (7) adapted to be filled with an adhesive (16); and a suspension member holder (8). A passage (9) is provided extending through the closed bottom side (6) of the housing (2), wherein the elongated suspension member (3) in an assembled state of the device extends through the passage (9) with the first end (10) positioned inside the housing cavity (7) and the second end (11) positioned outside the housing cavity (7) and wherein the suspension member holder (8) in the assembled state of the device positions the first end (10) and the thereto arranged anchoring head (4) of the suspension member (3) at a distance H1 from the closed bottom side (6). The (Continued)

invention also relates to a suspended ceiling system comprising such a device as well as a method for suspending a suspended ceiling in a structural ceiling.

19 Claims, 7 Drawing Sheets

(58) Field of Classification Search
USPC .................................................... 52/506.06
See application file for complete search history.

(56) References Cited

U.S. PATENT DOCUMENTS

| | | |
|---|---|---|
| 2,793,887 A | 5/1957 | Moore |
| 3,003,602 A * | 10/1961 | Lester ...................... E04B 9/22 |
| | | 52/291 |
| 4,167,259 A | 9/1979 | Bury |
| 5,024,038 A | 6/1991 | Depellegrini et al. |
| 5,687,526 A * | 11/1997 | Benvenuto ............ E04B 9/0478 |
| | | 52/506.05 |
| 2015/0027075 A1* | 1/2015 | Wilkens ................ E04B 9/0435 |
| | | 52/385 |

* cited by examiner

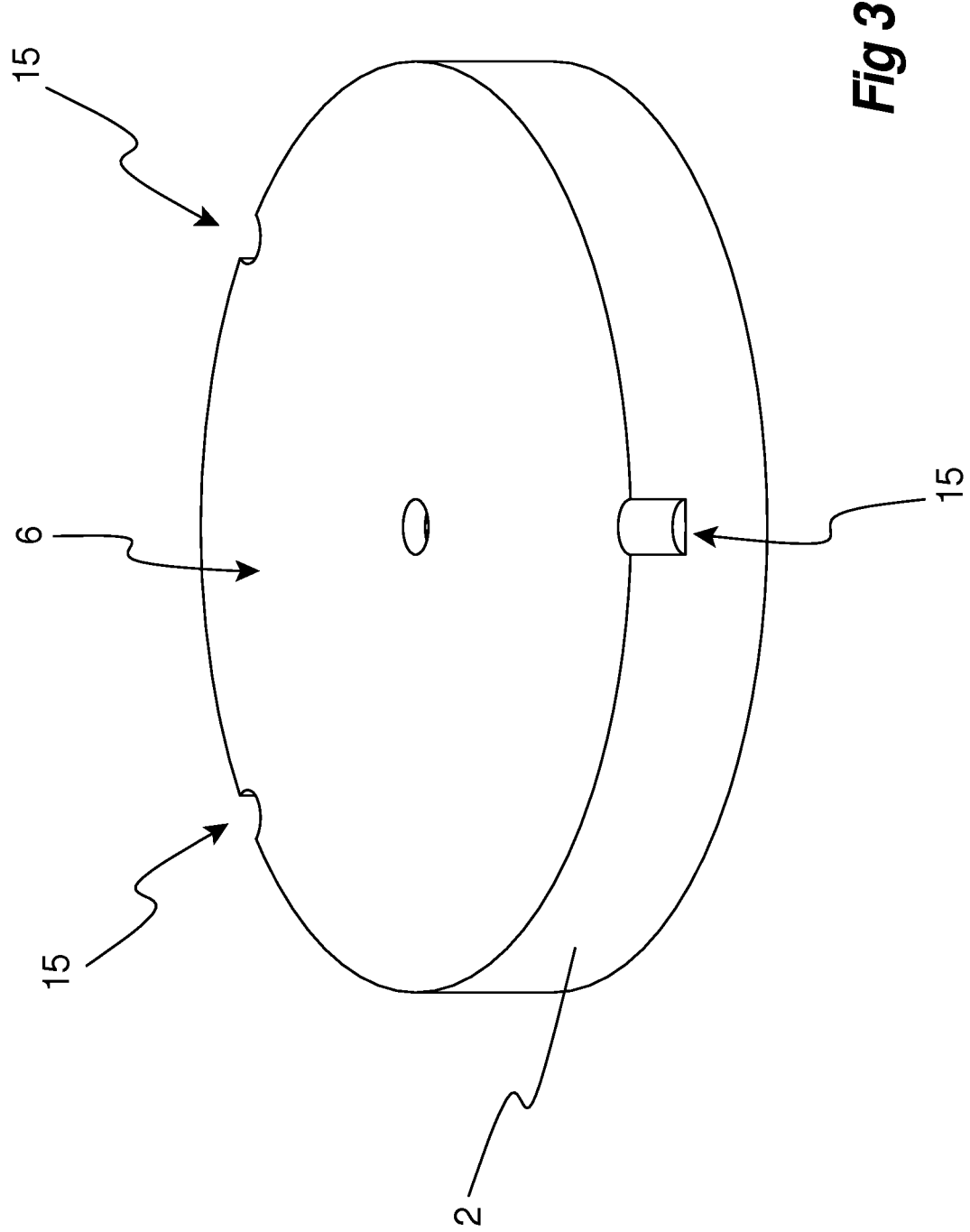

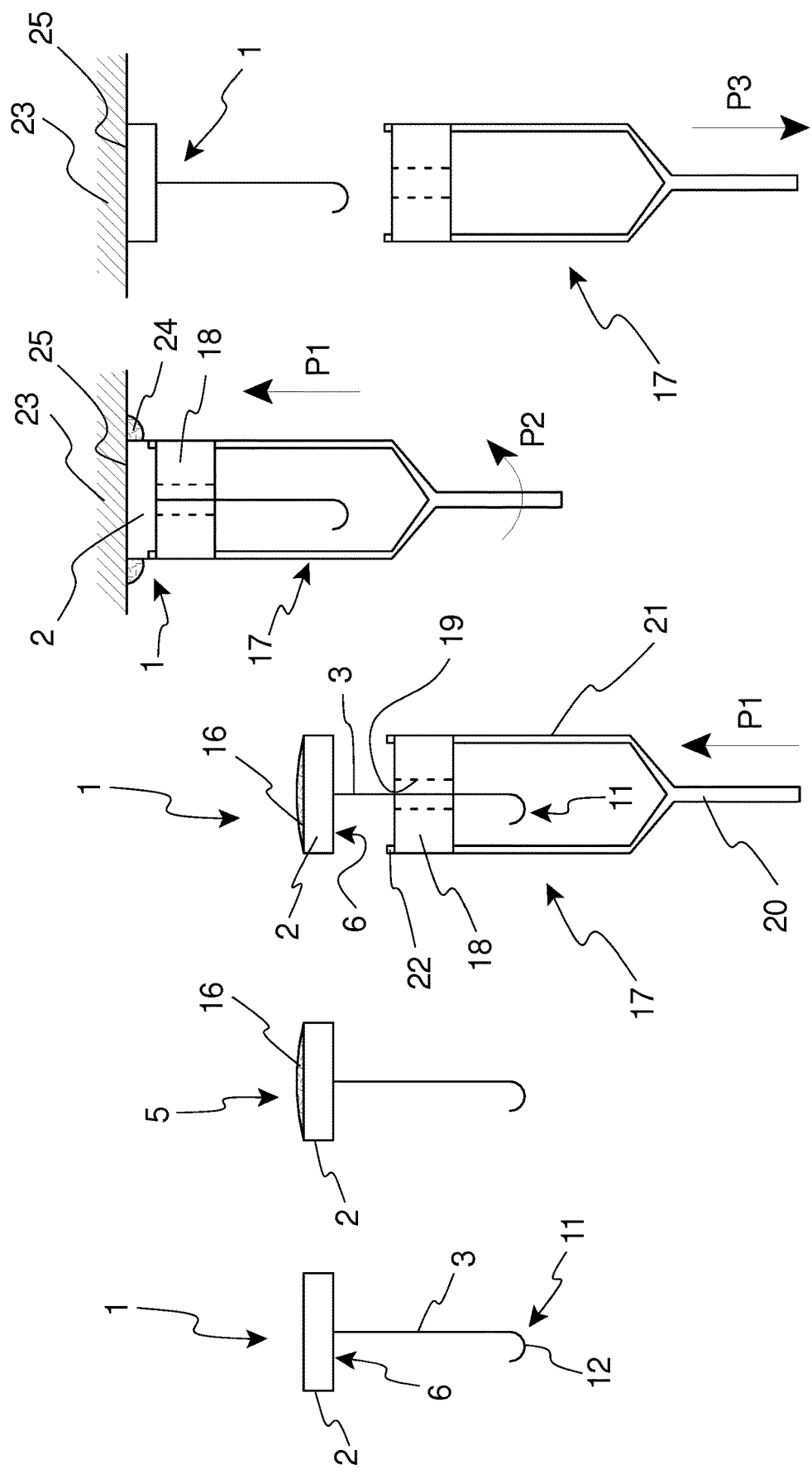

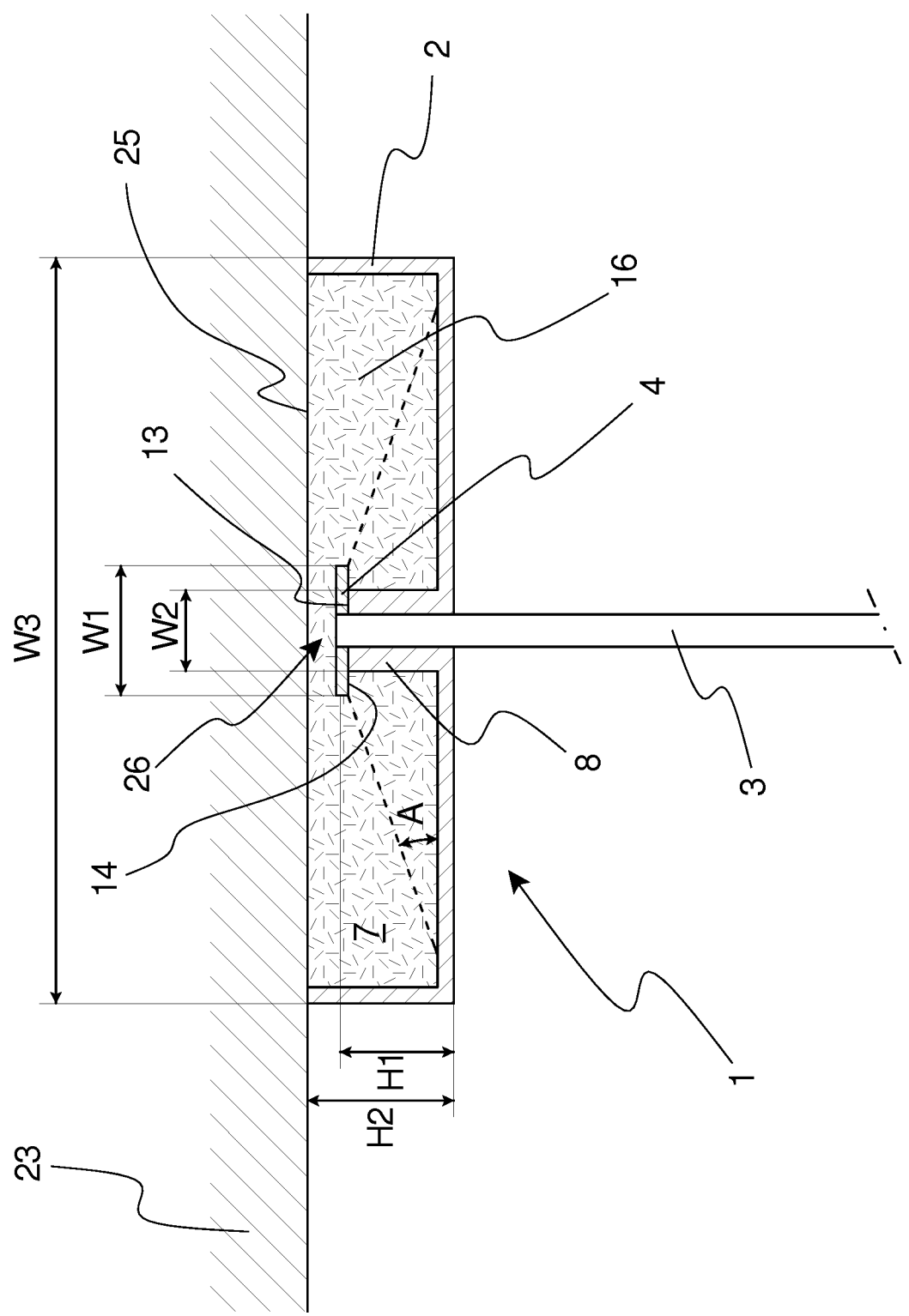

DEVICE AND METHOD FOR SUSPENSION OF A SUSPENDED CEILING AND A SUSPENDED CEILING

FIELD OF THE INVENTION

The present invention relates to suspended ceilings and more specifically to a device for suspension of a suspended ceiling, a suspended ceiling system comprising such a device and a method for suspension of a suspended ceiling in a structural ceiling.

BACKGROUND ART

When constructing buildings or similar, concrete is often used as it is a cost effective rigid material having a long service life. In concrete buildings, the foundation, the walls, the floor structures and the roof structures are commonly formed by reinforced concrete.

When using concrete slabs, it is common to use so called suspended ceilings or false ceilings. The suspended ceilings are then provided below the structural ceiling formed by the concrete slabs themselves. The suspended ceilings are commonly made up of a number of tiles which are suspended from the concrete slabs forming the structural ceiling.

In order to mount the tiles of the suspended ceiling, holes are commonly drilled in the structural ceiling. Hooks, wires, rods or similar are then provided in the drilled holes and the tiles are in turn suspended from the hooks, wires, rods or similar.

The suspended ceiling may be formed by ceiling tiles supported by a grid of profiles which in turn is suspended in the structural ceiling by means of the hooks, wires, rods or similar mentioned above.

Alternatively, the suspended ceiling may be formed by individually suspended and free hanging ceiling tiles using some of said hooks, wires, rods or similar.

The drilling of holes in the structural ceiling for suspension of ceiling tiles is for natural reasons time consuming. The time consuming work implies high costs due to e.g. personnel expenses. In addition, the working environment might be a health hazard to the person drilling the holes due to the exposure to vibrations, noise and concrete dust. The noise may also constitute an inconvenience for the tenants in the building since the noise easily propagates through the building.

Further, when drilling a significant amount of holes in the structural ceiling of a building there is a risk of damaging or destroying objects which are present in the structural ceiling, i.e. inside a concrete slab.

In fact, many types of objects may be present in the structural ceiling. For instance it is common to provide channels in which electrical cables are located. Hence, if a hole is drilled into a channel in which an electrical cable is located, there is an obvious risk that the cable might get damaged or destroyed. Even worse, a damaged cable may result in a potential fire hazard.

Similarly, it is common to provide water pipes in the slabs forming the structural ceilings of a building. When drilling a hole in the structural ceiling, there is then an obvious risk of damaging a water pipe, which might result in a leakage and water damages.

Also, the slabs comprise reinforcement bars which have to be avoided during drilling.

Further, so called Thermally Active Building Structures, TABS, are becoming increasingly popular, due to its ability to cool or heat the indoor environment of the building. TABS are used to control the indoor environment of a concrete building, by cooling or heating the concrete slabs of the building. In order to achieve this, the concrete slabs are provided with channels in form of pipes, ducts or similar. Water having a controlled temperature is then circulated in the channels in order to heat or cool the beams, which in turn heats or cools the building.

When TABS are used to mainly cool a building, the channels provided in the slabs are situated close to the lower surface of the slab, i.e. close to the structural ceiling of the building. The reason for the channels being provided close to the surface is that an improved efficiency is achieved by this arrangement. In practice, the channels are typically provided only a few centimeters below the concrete surface of the slabs of the building.

As the concrete slabs of the TABS are penetrated with numerous bends of water filled channels close to the concrete surface there is an even further increased risk of damaging a channel when drilling a hole.

In order to avoid damages, the drilling locations might be determined if the personnel drilling the holes are aware of the locations of the channels within the slabs. However, the process of determining the drilling locations is time consuming and undesired.

Hence, there is a need for an improved suspended ceiling system for a room having a structural ceiling and method for providing a suspended ceiling in a room having a structural ceiling.

In U.S. Pat. No. 2,385,296, a hanger fixture for cementitious connection to a surface is disclosed. The hanger fixture comprises a perforated plate supporting a threaded portion which in turn threadingly engages a hanger, such as a hook. The base plate is attached to the surface by means of a cementitious adhesive.

SUMMARY OF THE INVENTION

In view of that stated above, the object of the present invention is to provide an improved device and method for suspension of suspended ceilings.

It is also an object to provide such a device and method requiring a minimum of drilling while having sufficient load bearing capacity.

It is further an object to provide a suspended ceiling system comprising such a device.

To achieve at least one of the above objects and also other objects that will be evident from the following description, a device having the features defined in claim 1, a suspended ceiling system having the features defined in claim 11 and a method having the features defined in claim 13 are provided according to the present invention. Preferred embodiments of the device and method will be evident from the dependent claims.

More specifically, there is provided according to the present invention a device for suspension of a suspended ceiling, comprising an elongated suspension member having a first end and an opposing second end, an anchoring head being arranged at the first end; a housing having an open top side and an opposed, closed bottom side, the housing defining a housing cavity adapted to be filled with an adhesive; and a suspension member holder, wherein a passage is provided extending through the closed bottom side of the housing, and wherein the elongated suspension member in an assembled state of the device extends through the passage with the first end positioned inside the housing cavity and the second end positioned outside the housing cavity and wherein the suspension member holder in the assembled state of the device positions the first end and the thereto arranged anchoring head of the suspension member at a distance H1 from the closed bottom side.

It should be noted that within the context of this application the term "elongated suspension member" may be any type of elongated member suitable for suspending a suspended ceiling. Thus, an elongated suspension member may comprise a hook, wire, rod or similar.

It should also be noted that within the context of this application the term "suspended ceiling" may be any type of ceiling arranged below a structural ceiling. Thus, the suspended ceiling may be formed by ceiling tiles supported by a grid of profiles which in turn is suspended in the structural ceiling. Alternatively, the suspended ceiling may be formed by individually suspended and free hanging ceiling tiles.

Hereby an improved device for suspension of a suspended ceiling is provided. Since the device is adapted to be attached to the structural ceiling by means of an adhesive, no drilling in the structural ceiling will be required.

Further, the housing having a housing cavity adapted to be filled with the adhesive provides a mould which is easy to use when installing the inventive device.

Since the device comprises a suspension member holder which in the assembled state of the device positions the first end and the thereto arranged anchoring head of the suspension member at a distance H1 from the closed bottom side, it may be ensured that the anchoring head forms an overhang and that a free space is formed under the anchoring head, i.e. between the anchoring head and the closed bottom side of the housing. Thus, it may be ensured that the anchoring head becomes fully embedded when the housing cavity of the housing is filled with an adhesive.

The suspension member holder may be placed inside or outside the housing cavity.

The suspension member holder may be integrally formed with housing, with the anchoring head or with the elongated suspension member. Alternatively, the suspension member holder may be formed as a separate part. The suspension member holder may thus be a separate part placed inside the housing cavity or any suitable external means placed outside the housing cavity for temporarily positioning of the first end and the thereto arranged anchoring head until the position has been permanently fixed by an adhesive added into the cavity.

The provision of a suspension member holder arranged to position the first end and associated anchoring head at a distance H1 from the closed bottom side of the housing ensures that the anchoring head efficiently may transfer a load form the suspension member to the structural ceiling in the installed state of the inventive device.

More specifically, the inventive device may filled with an adhesive in the form of a cement composition and the device may then be designed with such a distance H1 between the anchoring head arranged at the first end of the suspension member holder and the closed bottom side of the housing resulting in a cone failure of the adhesive in the installed state of the device corresponding to a desired maximum load bearing capacity of the device.

According to an embodiment of the inventive device, the suspension member holder may be arranged in the housing cavity and may form an extension of the passage. The suspension member holder may thus form a spacer for positioning the anchoring head at a distance H1 from the bottom side.

According to another embodiment of the inventive device, the suspension member holder may be arranged to hold the suspension member such that the anchoring head becomes embedded when the housing cavity is filled with the adhesive. Hereby it may be ensured that a load applied to the suspension member is efficiently transferred to the structural ceiling. The anchoring head may have a head width W1 which is greater than a holder width W2 of the suspension member holder. Hereby an overhang or undercut is provided, even if the suspension member holder is placed inside the housing cavity, ensuring that the anchoring head is properly embedded when the housing cavity is filled with an adhesive. For the case when the adhesive is a cement composition, this may result in a controlled cone failure when the maximum load bearing capacity of the device is reached.

The distance H1 may be in the range of 5-50 mm and more preferably in the range of 8-15 mm. The housing has a height H2 and the difference between the height H2 and the distance H1 may be in the range of 0-10 mm and more preferably in the range of 2-5 mm. If the difference between the height H2 and the distance H1 is greater than zero, a cavity space may be formed above the anchoring head, which cavity space is filled when the cavity is filled with the adhesive. Hereby an increased adhesive strength may be obtain in the load bearing interface between the adhesive and the structural ceiling in the installed state of the device.

According to yet another embodiment of the device, the housing may be provided with exterior mounting means arranged for cooperation with a mounting tool. Hereby the mounting or installation of the inventive device is facilitated.

The device may have housing with a cylindrical shape. The housing may be made of a polymer or metal material.

According to a further embodiment, a fully cured adhesive may be arranged in the housing cavity, wherein a head space is provided extending between an upper surface of the fully cured adhesive and the open top side of the housing. Hereby the amount of adhesive to be filled into the housing cavity, i.e. into the head space, at the site of actual use of the inventive device may be reduced.

According to another aspect of the invention, a suspended ceiling system is provided comprising a suspended ceiling suspended in a structural ceiling of a building by means of a device according to the above. The housing cavity of the housing is filled with an adhesive embedding the anchoring head positioned inside the housing cavity, and the adhesive is bonded to the structural ceiling at the open top side of the housing. A load applied to the second end of the suspension element is transferred to the structural ceiling via the anchoring head embedded in the adhesive.

According to an embodiment of the inventive suspended ceiling system, the adhesive may be a cement composition.

According to yet another aspect of the invention, a method for suspension of a suspended ceiling to a structural ceiling of a building is provided, the method comprising providing a device for suspension of a suspended ceiling, the device comprising an elongated suspension member having a first end and an opposing second end, an anchoring head being arranged at the first end, and a housing having an open top side and an opposed, closed bottom side, the housing defining a housing cavity adapted to be filled with an adhesive, wherein a passage is provided extending through the closed bottom side of the housing, arranging the elongated suspension member such that it extends through the passage of the suspension member holder with the first end and the thereto arranged anchoring head positioned inside the housing cavity at a distance H1 from the closed bottom side and the second end positioned outside the housing cavity, filling the housing cavity with an adhesive, and pressing the device against the structural ceiling with the open top end of the housing facing the structural ceiling such that the adhesive filling the housing cavity comes into contact and bonds with the structural ceiling thereby forming a load bearing interface The details and advantages of the second and third aspects of the invention are largely analogous to those of the first aspect of the invention, wherein reference is made to the above.

According to an embodiment of the method, the step of filling the housing cavity may comprise overfilling the housing cavity with the adhesive such that the adhesive piles up through the open top side of the housing. Hereby it is ensured that the housing cavity may be completely filled during installation of the device whereas surplus adhesive may be pressed away and be dispensed with.

According to another embodiment of the method, it may further comprise matching the properties of the adhesive with corresponding properties of the structural ceiling, the properties at least including crimping property, compression strength, thermal expansion or moist expansion. By matching the properties, it is possible to increase the adhesive strength between the adhesive and the structural ceiling, i.e. the adhesive strength of the load bearing interface, and also to maximize the life span of the load bearing interface.

The adhesive may be a cement composition. Calcium aluminate cement may be included in the cement composition.

According to yet another embodiment of the inventive method, the adhesive used is selected from the group of adhesives having a tack sufficient for the device to adhere to the structural ceiling once it has been pressed against the same and a basic curing time in the range of 15-60 minutes.

It should be noted that within the context of this application the term "basic curing time" is meant the time required for the adhesive to cure sufficiently for the device to be able to bear a desired load. The total curing time, i.e. when the curing has been fully completed, may be longer, for instance 25-30 days.

According to a further embodiment, the step of filling the housing cavity with an adhesive may comprise a sub step of partly filling the hosing cavity with a first adhesive such that an unfilled head space is formed in the housing cavity and a second sub step of final filling of the housing cavity with a second adhesive, wherein the sub step of final filling of the housing cavity is performed after the first adhesive has cured. Hereby, it will be possible of partly fill the housing cavity at the site of production of the device, and to final fill the device at the site of actual use of the device. Thus, the amount of adhesive used at the site of actual use may be reduced. The first adhesive may be added in such amount that the anchoring head becomes fully embedded in the first adhesive. The first adhesive and the second adhesive may be of the same type or of different types.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 3 is a schematic perspective view of a housing of an inventive device.

FIGS. 4a-4e are schematic side views illustrating an embodiment of an inventive method of installation of an inventive device on a structural ceiling.

FIG. 6 is a sectional side view of an inventive device installed on a structural ceiling.

DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
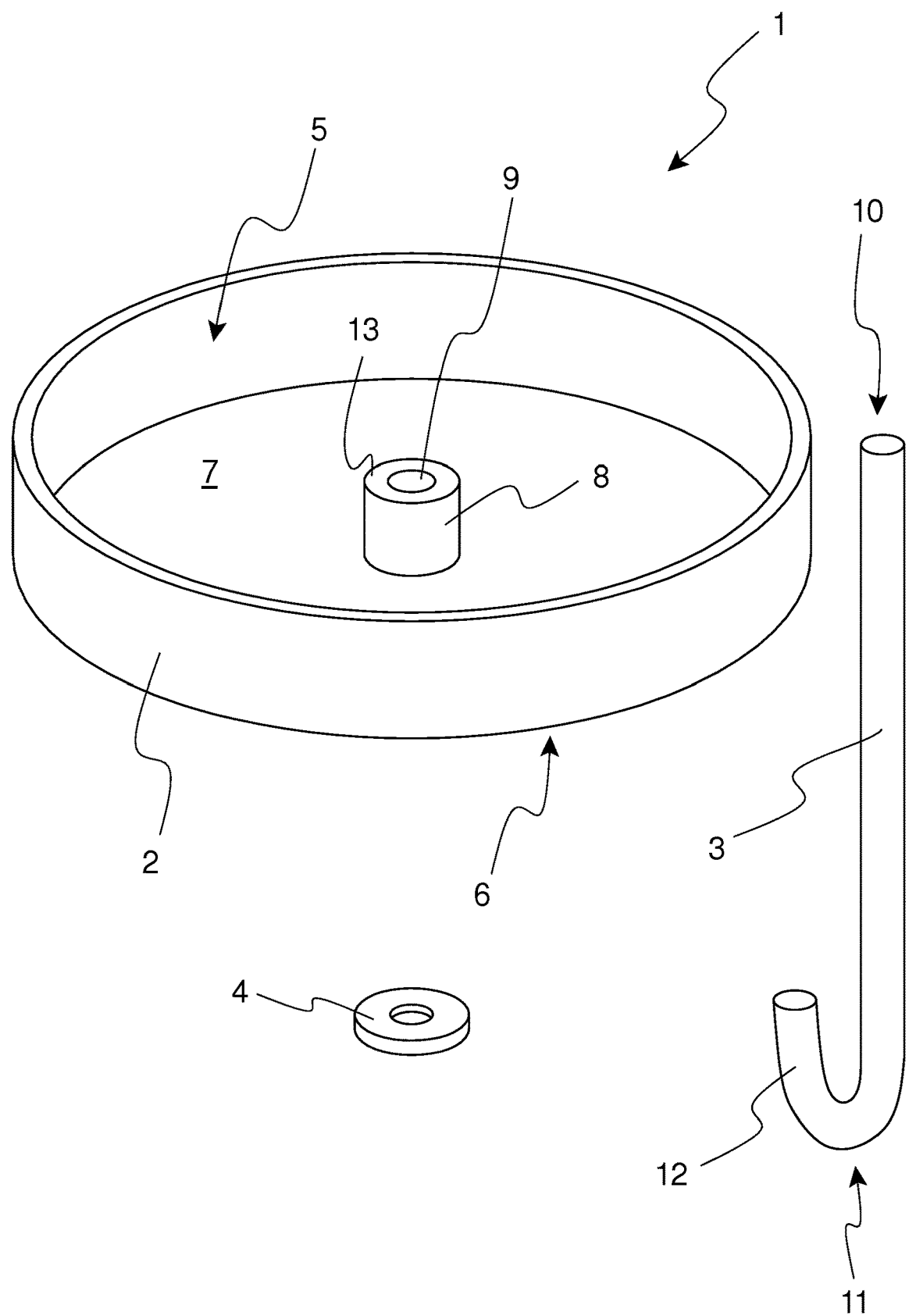
FIG. 1 is a schematic perspective view of components of an embodiment of an inventive device.

FIG. 1, to which reference now is made, discloses different components of an embodiment of a device 1 for suspension of a suspended ceiling according to the invention. The device 1 is shown in a disassembled state and comprises a housing 2, an elongated suspension member 3, a suspension member holder 8 and an anchoring head 4.

The housing 2 has an open top side 5 and a closed bottom side 6; and defines a housing cavity 7 adapted to be filled with an adhesive. In the shown embodiment, the housing 2 has a circular shape, but it is understood that other shapes are possible. The housing may be made of any suitable material, such as plastic or metal.

The housing 2 is provided with a passage 9 extending through the closed bottom side 6 of the housing 2. In the shown embodiment, the suspension member holder 8 is formed integrally with the housing 2 and is arranged in the housing cavity 7. In the shown embodiment, the suspension member holder 8 is hollow and thus forms an extension of the passage 9 extending through the closed bottom side 6 of the housing 2. In the shown embodiment, the suspension member holder 8 is arranged in a housing wall section included in the bottom side 6 of the housing 2. More specifically, the suspension member holder 8 is formed by a protrusion extending into the housing cavity 7 from the housing wall section, wherein the passage 9 is formed by a through hole extending through the protrusion in a direction perpendicular to a plane defined by the extension of the bottom side 6 of the housing 2. Alternatively, the suspension member holder may be formed as a separate piece or may be formed integrally with the anchoring head or with the elongated suspension member.

The elongated suspension member 3 has a first end 10 and an, opposing second end 11. The anchoring head 4 is intended to be arranged at the first end 10 and may for instance be constituted by a nut arranged to be screwed on to a thread provided at the first end of the suspension member. The second end 11 of the suspension member 3 may be provided with a suspension arrangement 12, such as a hook, as disclosed in the shown embodiment, or an external thread.

In the shown embodiment, the suspension member is formed by a rod provided with a hook. It is understood that the suspension member may be designed differently. For instance, the length of the suspension member might be adjustable and may for this reason comprise two mutually displaceable rods. Alternatively, the suspension member may be formed by a wire or a string.

Figure 2:
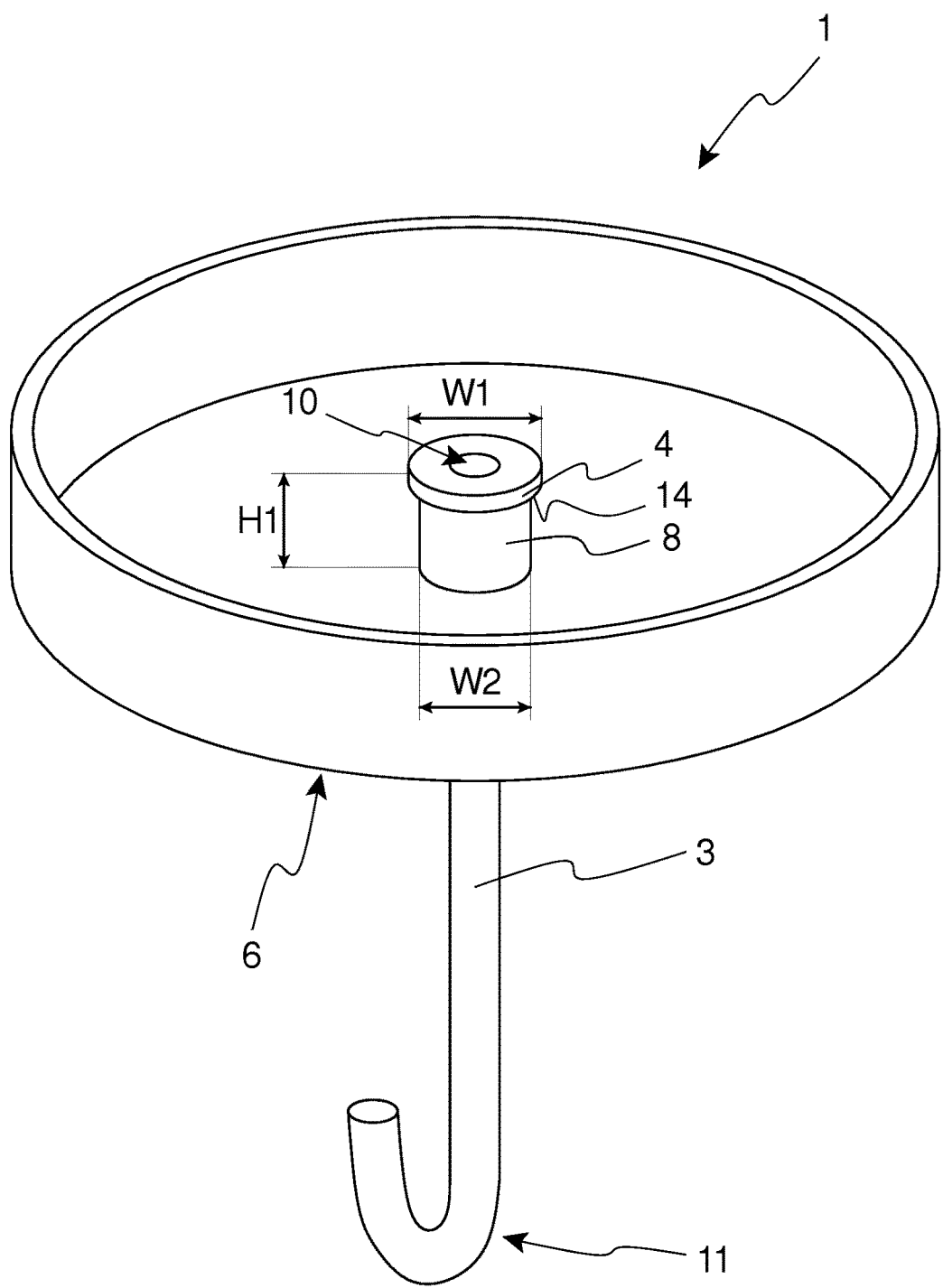
FIG. 2 is a schematic perspective view illustrating the device shown in FIG. 1 in an assembled state.

With reference to FIG. 2, the inventive device 1 is shown in an assembled state. The first end 10 has been inserted into the passage 9 and arranged in the housing cavity 7, and the anchoring head 4 has been arranged at and attached to the first end 10. Thus, in the assembled state, the suspension member 3 extends through the passage 9 with the first end 10, and hence also the anchoring head 4 connected thereto, positioned inside the housing cavity 7 and the second end 11 positioned outside the housing cavity 7.

The suspension member holder 8 positions the first end 10 and the thereto attached anchoring head 4 of the suspension member 3 at a distance H1 from the closed bottom side 6. In the shown embodiment this is accomplished by the protrusion forming the suspension member holder 8, the protrusion having an upper bearing surface 13 (indicated in FIG. 1) supporting the anchoring head 4 in the assembled state of the device 1.

The suspension member holder 8 is further arranged to position the anchoring head 4 inside the housing cavity such that an overhang 14 or an undercut is formed, thereby providing a free space extending from the anchoring head to the bottom side. In the shown embodiment, the anchoring head 4 has a head width W1 which is greater than a holder width W2 of the suspension member holder 8. Since both the anchoring head 4 and the suspension member holder 8 are circular in the shown embodiment, the head width W1 and the holder width W2 correspond to the associated diameter.

The difference in width between the anchoring head 4 and the suspension member holder 8 ensures that the anchoring head becomes embedded with the overhang 14 or undercut when the housing cavity is filled with an adhesive, which also will be described more in detail below.

The housing 2 may be provided with exterior mounting means 15 arranged for cooperation with a mounting tool. In an embodiment shown in FIG. 3, the mounting means 15 is formed by recesses arranged about the periphery of the bottom side 6 of the housing 2. The mounting tool (not shown) may in this case be provided with corresponding projections to be received by the recesses in order to enable rotational movement of the housing 2 during installation or mounting of the inventive device 1 on a structural ceiling.

According to the present invention, the device 1 is used in an inventive method for suspension of a suspended ceiling. The method comprises installation or mounting of the device 1 on the structural ceiling and an embodiment of the method will now be described more in detail with reference to FIGS. 4a-4e.

FIG. 4a schematically illustrates an inventive device 1 of the type shown in FIG. 2 in an assembled state. Thus, the elongated suspension member 3 extends through the passage of the suspension member holder of the housing 2 such that the first end and the anchoring head attached thereto is positioned inside the housing cavity at a distance from the closed bottom side 6 and the second end 11 is positioned outside the housing cavity 7. In the shown embodiment, the second end 11 is provided with a suspension arrangement 12 in the form of a hook.

In FIG. 4b, the housing cavity has been filled with an adhesive 16, such as a cement composition. In the shown embodiment, the housing cavity is overfilled with the adhesive 16, such that the adhesive 16 plies up through the open top side 5 of the housing 2.

In FIG. 4c, a mounting tool 17 is moved to towards the inventive device 1 in the direction indicated by arrow P1. In the shown embodiment, the mounting tool 17 comprises an upper section 18 provided with a central opening 19 allowing the upper section 18 to be passed over the second end 11 of the suspension member 3. The upper section 18 is connected to a handle 20 via two arms 21. The upper section 18 is passed over the second end 11 of the suspension member 3 in order to be brought to the closed bottom side 6 of the housing 2 such that two projections 22 arranged on top of the upper section 17 are received in corresponding recesses in the closed bottom side 6 of the housing 2. The handle may be of sufficient length, such that a person using the mounting tool may reach the structural ceiling and mount the device standing on the floor. The length of the handle may be adjustable and may for this reason be telescopic.

In FIG. 4d, the inventive device 1 has been moved in the P1 direction towards a structural ceiling 23 by means of the mounting tool 17. The open top side of the housing 2 is facing the structural ceiling 23, and by pressing the device 1 against the ceiling 23, the adhesive comes into contact with the structural ceiling 23. The housing 2 will act as a mould for the adhesive while the device 1 is pressed against the structural ceiling 23. The projections of the upper section 18 of the mounting tool 17 received in the recesses of the housing 2, enables the device 1 to be turned or rotated in the direction indicated by arrow P2 by means of the mounting tool 17 while simultaneous pressing the device 1 against the ceiling 23. Hereby it is ensured that the adhesive fills up the housing cavity while surplus adhesive material 24 may be pressed out. The surplus adhesive material 24 may subsequently be removed.

The part of the structural ceiling 23 against which the inventive device 1 is pressed may be pre-treated. The pre-treatment may comprise priming, brushing and/or washing. In many cases where the structural ceiling is in form of a concrete slab, it may be sufficient to pre-treat the part of the structural ceiling by brushing with a wire brush in order to rug the surface.

Once the adhesive 16 has been brought into contact with the structural ceiling 23 the adhesive 16 may bond and form a load bearing interface indicated at 25.

In FIG. 4e, the mounting tool 17 is removed in the direction indicated by arrow P3 leaving the inventive device 1 attached to the structural ceiling 23.

A plurality of devices 1 mounted as described above may then be used for installation of a grid of profiles in which a plurality ceiling tiles subsequently may be placed. Alternatively, the devices may be used of installation of free hanging ceiling tiles by means of suitable means such as wires, rods or strings.

According to an alternative embodiment of the inventive method, pre-filled devices may be used. In this alternative method, the filling of the assembled device 1 with an adhesive is performed in a two-step process, wherein the two steps may be separate in time and location.

Figure 5A:
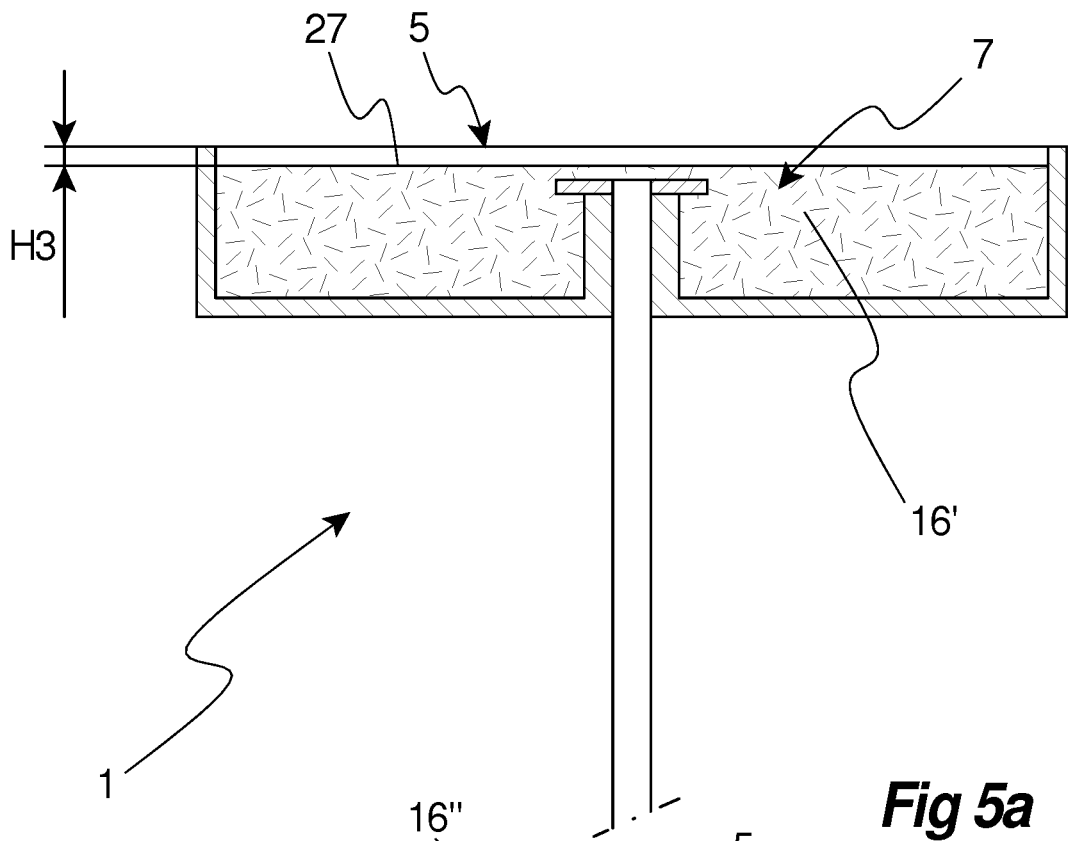
FIGS. 5a-5b are sectional side views illustrating steps of an alternative embodiment of the inventive method of installation of an inventive device on a structural ceiling.

In a first step, the assembled device 1 is partly filled with a first adhesive 16', as illustrated in FIG. 5a. The first adhesive 16' may be filled into the housing cavity 7 such that the anchoring head 4 becomes fully embedded in the adhesive 16' while leaving an unfilled head space in the housing cavity 7. The head space extends between an upper surface 27 of the first adhesive 16' and the open top side 5 of the housing 2 and may have a height H3 of 2-5 mm.

The first step may be performed at a production plant in an automated process and the pre-filled device 1 may be vibrated in order to prevent entrapment of air in the adhesive 16' added in the first step.

The adhesive 16' added in the first step may be allowed to fully cure before a second step of the alternative method is preformed.

The pre-filled devices 1 may be stored before being subjected to the second step.

Figure 5B:
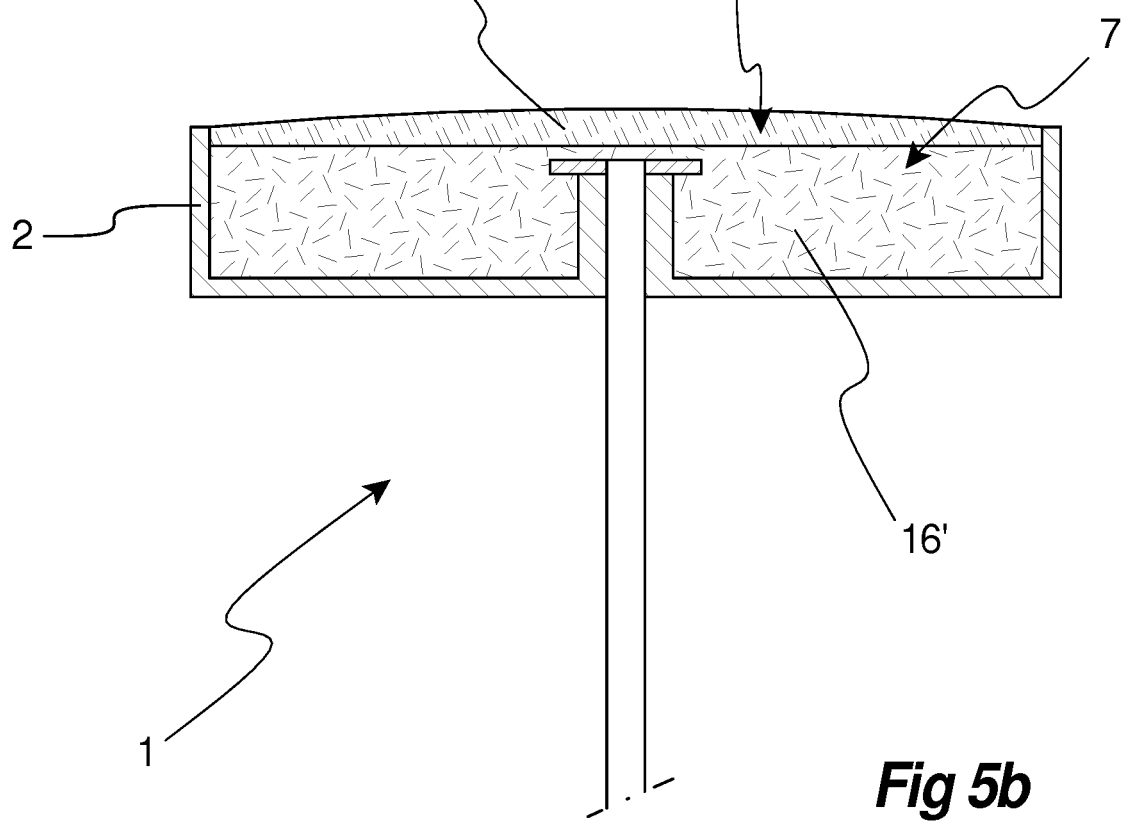

In the second step, the reminder of the housing cavity 7 is filled with a second adhesive 16", as illustrated in FIG. 5b.

The second step is performed at the site at which the device 1 is to be used for suspension of a suspended ceiling.

The second adhesive 16" used in the second step may be added in such amount that it piles up through the open top side 5 of the housing 2. The device 1 may then be pressed against a structural ceiling for mounting thereon in a way corresponding to that described above with reference to FIGS. 4c-4d.

If an inventive device not being provided with a suspension member holder placed inside the housing is used, the suspension member may be fixated relative the housing by a suspension member holder in the form of external means such that the anchoring head is positioned at a distance from the bottom side of the housing before the adhesive of the first step is filled into the hosing cavity. Once the adhesive added during the first step has cured, the suspension member and the anchoring head attached thereto will be permanently held in position.

The first adhesive 16' and the second adhesive 16" may be of different types. Alternatively, the first adhesive 16' and the second adhesive 16" may be of the same type.

The provision of pre-filled devices means that the amount of second adhesive to be used at the site where the devices are to be mounted or installed may be minimized, which is beneficial in terms of both time and logistics.

Further, the first adhesive added in the first step will after curing impart considerable rigidity to the pre-filled device. The rigidity of the pre-filled device may facilitate the mounting of the device when the second adhesive of the second step has been added and when the device subsequently is pressed against the structural ceiling.

The first adhesive used in the first step of the alternative embodiment of the inventive method disclosed above with reference to FIGS. 5a-b may be a conventional adhesive, such as a conventional Portland cement composition.

The second adhesive used in the second step or, alternatively, the adhesive used for filling of the entire housing cavity either in a single step process or in a two step process, may be an adhesive having a tack sufficient to allow removal of the mounting tool once the device has been pressed against the structural ceiling and optionally also to allow application of a minor load, such as connecting a hanger to the second end of the suspension member. The adhesive may thus have a tack or stickiness resulting in a load bearing capacity in the range of 0.5-2 kg (i.e. the weight of the device and optionally also of a minor load). Once the adhesive has cured sufficiently, the hanger may in turn be connected to a grid of profiles included in the suspended ceiling intended to be suspended by means of the inventive device.

The adhesive may further have a basic curing time allowing application of a desired load to the suspension member within certain time frame. The desired load may correspond to a proportional share of the weight of the grid of profils multiplied by a safety factor F which may be in the range of 2-3. The basic curing time may be in the range 15-60 minutes. The desired load may be in the range of 5-10 kg. By the term "basic curing time" is thus meant the time required for the adhesive to cure sufficiently for the device to be able to bear the desired load. The time required for the adhesive to fully cure may be longer, for instance 25-30 days.

The load bearing capacity of the of the installed device once the adhesive added at the site has fully cured may be at least 70 kg.

The adhesive may be a cement composition. The cement composition may include calcium aluminate cement.

When a cement composition comprising calcium aluminate cement is used, a water-cement ratio (w/c) of about 0.4 may be used in order to achieve required non-aging properties.

The adhesive used together with the inventive device may have properties matched with corresponding properties of the structural ceiling. The matched properties may comprise at least one of crimping property, compression strength, thermal expansion or moist expansion (i.e. expansion caused by exposure to moisture). In case the adhesive is filled in a two-step process, the adhesive added in the second step may also be matched with the adhesive added in the first step.

A cross section of an embodiment of the inventive device 1 attached to a structural ceiling 23 is shown in FIG. 6. As evident from the figure, the housing cavity 7 is filled with the adhesive 16 thereby embedding the anchoring head 4 of the suspension member 3.

The anchoring head 4 has a head width W1 which is greater than a holder width W2 of the suspension member holder 8, whereby an overhang 14 or undercut is formed allowing the anchoring head to become properly embedded in the adhesive 16 allowing load transfer from the embedded anchoring head 4 to the structural ceiling 23.

The upper bearing surface 13 of the protrusion forming the suspension member holder 8 in the shown embodiment is arranged such that the anchoring head 4 is positioned at a distance H1 from the closed bottom side 6 of the housing 2. The housing 2 has a housing height H2, and the difference between the housing height H2 and the distance H1 ensures the formation of a cavity space 26 above the anchoring head 4 which is occupied by the adhesive 16.

When the suspension member 3 of inventive device 1 attached to the structural ceiling 23 is subjected to a load, the load will be transferred to the structural ceiling 23 via the anchoring head 4. More specifically, the load will be transferred from the anchoring head 4 to the adhesive 16 and further to the structural ceiling 23 via the load bearing interface 25 formed by the adhesive 16 bonding to the structural ceiling 23.

Application of an excess load may result in a failure of the device. For the case when the adhesive is a cement composition and provided that the height of the space cavity 26 is sufficient, i.e. that the difference between the housing height H2 and the distance H1 is sufficiently great, and that the adhesive 16 has properly bonded to the structural ceiling 23, the failure will manifest as a controlled cone failure which is indicated by dashed lines in FIG. 5.

The cone angle A of the cone failure may be in the range 20-40° for a cement composition comprising calcium aluminate cement.

The load required for generating a controlled cone failure will be dependent on the cement composition used and also the cone size. The cone size is dependent on the cone angle a as well as the cone height, which essentially correspond to the distance H1. Of course, the housing width W3 should be sufficient for accommodating the cone.

In a practical test of the load strength, inventive devices having circular housings were used. The housing height H2 and the distance H2 of the housings were 12 and 10 mm, respectively. The housing width W3, i.e. the diameter, was 60 mm. Further, an adhesive was used in the form of a cement composition according to EN 1504, class R3. The housing cavity was filled with the adhesive in a single step process.

The bond strength for the cement composition used is $f_b$=1.5 MPa, and the theoretical adhesive resistance is then $N_{R,b}$=4 200 N.

Controlled cone failures with a cone angle A of about 30° were observed when the applied load amounted to about 1100 N, i.e. well below the failure limit of the load bearing interface between the adhesive and the structural ceiling.

Figure 7:
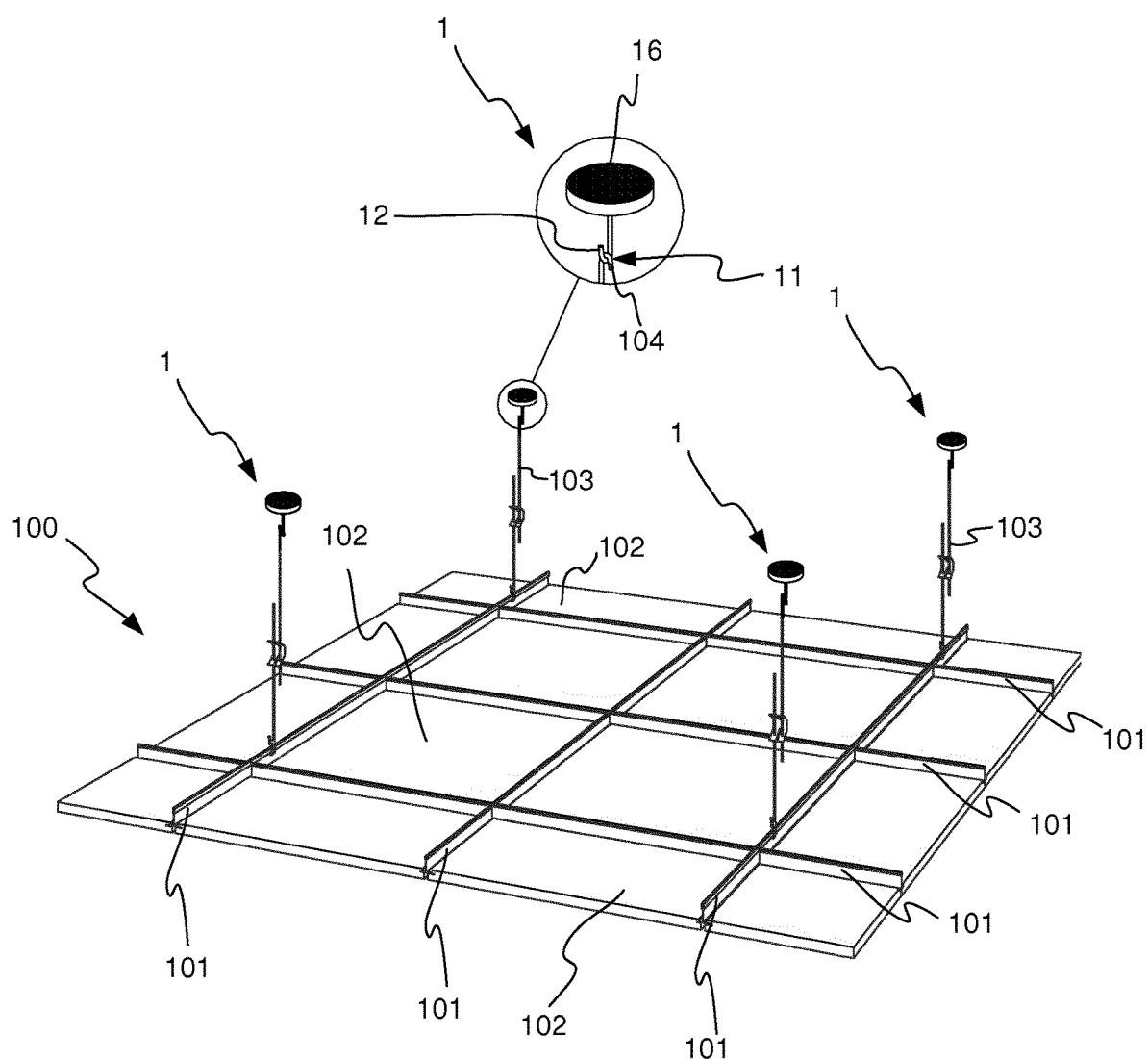
FIG. 7 is a perspective view of an embodiment of a suspended ceiling system mounted in accordance with the invention.

A suspended ceiling system 100 according to the invention is shown in FIG. 7, to which reference now is made. The suspended ceiling system 100 comprises a grid of profiles 101 supporting a number of ceiling panels 102. Hangers 103 are attached to the grid of profiles 101, and each hanger 103 is connected to a device 1 of the type described above for instance with reference to FIG. 2. Each device 1 is in turn attached to a structural ceiling (not shown) by means of the adhesive 16 bonded to the same.

As evident from the detached enlarged view in FIG. 6, the hanger 103 is provided with an upper hook 104 connecting to a suspension arrangement 12 in the form of a hook provided at the second end 11 of the suspension member 3 of the device 1.

The hangers 103 may, as in the shown embodiment, be of the type having an adjustable length.

In order to install the inventive suspended ceiling system 100, the devices 1 are mounted at selected positions on the structural ceiling. These positions may be determined and indicated by using laser measurement equipment. In connection with mounting of each device 1, a hanger 103 may be connected to the second end 11 of the suspension member 3 since the adhesive 16 used may have a tack or stickiness sufficient for the device immediately after mounting to adhere to the structural ceiling and also to bear a minor load. Once the devices 1 have been mounted, the installation of the grid of profiles 101 may commence. Since the adhesive 16 used may have a basic curing time in the range of 15-60 minutes, this work may commence immediately after the mounting of the devices 1 by using the devices installed first. Finally, the ceiling panels 102 may be installed in the frames defined by the grid of profiles 101.

It will be appreciated that the present invention is not limited to the embodiments shown. Several modifications and variations are thus conceivable within the scope of the invention which thus is exclusively defined by the appended claims.

The invention claimed is:

1. A device for suspension of a suspended ceiling, comprising
   an elongated suspension member having a first end and an opposing second end, an anchoring head being arranged at the first end;
   a housing having an open top side and an opposed, closed bottom side, the housing defining a housing cavity adapted to be filled with an adhesive; and
   a suspension member holder,
   wherein a passage is provided extending through the closed bottom side of the housing,
   wherein the elongated suspension member in an assembled state of the device extends through the passage with the first end
   positioned inside the housing cavity and the second end positioned outside the housing cavity and
      wherein the suspension member holder in the assembled state of the device positions the first end and the thereto arranged anchoring head of the suspension member at a distance H1 from the closed bottom side.

2. The device according to claim 1, wherein the suspension member holder is arranged in the housing cavity and forms an extension of the passage.

3. The device according to claim 1, wherein the suspension member holder is arranged to hold the suspension member such that the anchoring head becomes embedded when the housing cavity is filled with adhesive.

4. The device according to claim 1, wherein the anchoring head has a head width W1 which is greater than a holder width W2 of the suspension member holder.

5. The device according to claim 1, wherein the distance H1 is in the range of 5-50 mm and more preferably in the range 8-15 mm.

6. The device according to claim 1, wherein the housing has a height H2 and wherein the difference between the height H2 and the distance H1 is in the range of 0-10 mm and more preferably in the range of 2-5 mm.

7. The device according to claim 1, wherein the housing is provided with exterior mounting means arranged for cooperation with a mounting tool.

8. The device according to claim 1, wherein the housing has a cylindrical shape.

9. The device according to claim 1, wherein the housing is made of a polymer or metal material.

10. The device according to claim 1, in which a fully cured adhesive is arranged in the housing cavity, wherein a head space is provided extending between an upper surface of the fully cured adhesive and the open top side of the housing.

11. A suspended ceiling system comprising a suspended ceiling suspended in a structural ceiling of a building by means of a device according to claim 1,
    wherein the housing cavity of the housing is filled with an adhesive embedding the anchoring head positioned inside the housing cavity, and
    wherein the adhesive is bonded to the structural ceiling at the open top side of the housing,
    whereby a load applied to the second end of the suspension element is transferred to the structural ceiling via the anchoring head embedded in the adhesive.

12. The suspended ceiling system according to claim 11, wherein the adhesive is a cement composition.

13. A method for suspension of a suspended ceiling to a structural ceiling of a building, comprising
    providing a device for suspension of a suspended ceiling, the device comprising an elongated suspension member having a first end and an opposing second end, an anchoring head being arranged at the first end, and a housing having an open top side and an opposed, closed bottom side, the housing defining a housing cavity adapted to be filled with an adhesive, wherein a passage is provided extending through the closed bottom side of the housing, arranging the elongated suspension member such that it extends through the passage with the first end and the thereto arranged anchoring head positioned inside the housing cavity at a distance H1 from the closed bottom side and the second end positioned outside the housing cavity, filling the housing cavity with an adhesive, and pressing the device against the structural ceiling with the open top end of the housing facing the structural ceiling such that the adhesive filling the housing cavity comes into contact and bonds with the structural ceiling thereby forming a load bearing interface.

14. The method according to claim 13, wherein the step of filling the housing cavity comprises overfilling the housing cavity with the adhesive such that the adhesive piles up through the open top side of the housing.

15. The method according to claim 13, further comprising matching the properties of the adhesive with corresponding properties of the structural ceiling, the properties at least including crimping property, compression strength, thermal expansion or moist expansion.

16. The method according to claim 13, wherein the adhesive is a cement composition.

17. The method according to claim 16, wherein calcium aluminate cement is included in the cement composition.

18. The method according to claim 16, wherein the cement composition used is selected from the group of cement compositions having a tack sufficient for the device to adhere to the structural ceiling once it has been pressed against the same and a basic curing time in the range of 15-60 minutes.

19. The method according to claim 13, wherein the step of filling the housing cavity with an adhesive comprises a sub step of partly filling the hosing cavity with a first adhesive such that an unfilled head space is formed in the housing cavity and a second sub step of final filling of the housing cavity with a second adhesive, wherein the sub step of final filling of the housing is performed after the first adhesive has cured.

* * * * *